Oct. 9, 1928.                                                          1,686,635
                        W. G. MYLIUS ET AL
                   ELECTRICAL MEASURING INSTRUMENT
                Filed March 31, 1927        2 Sheets-Sheet 1
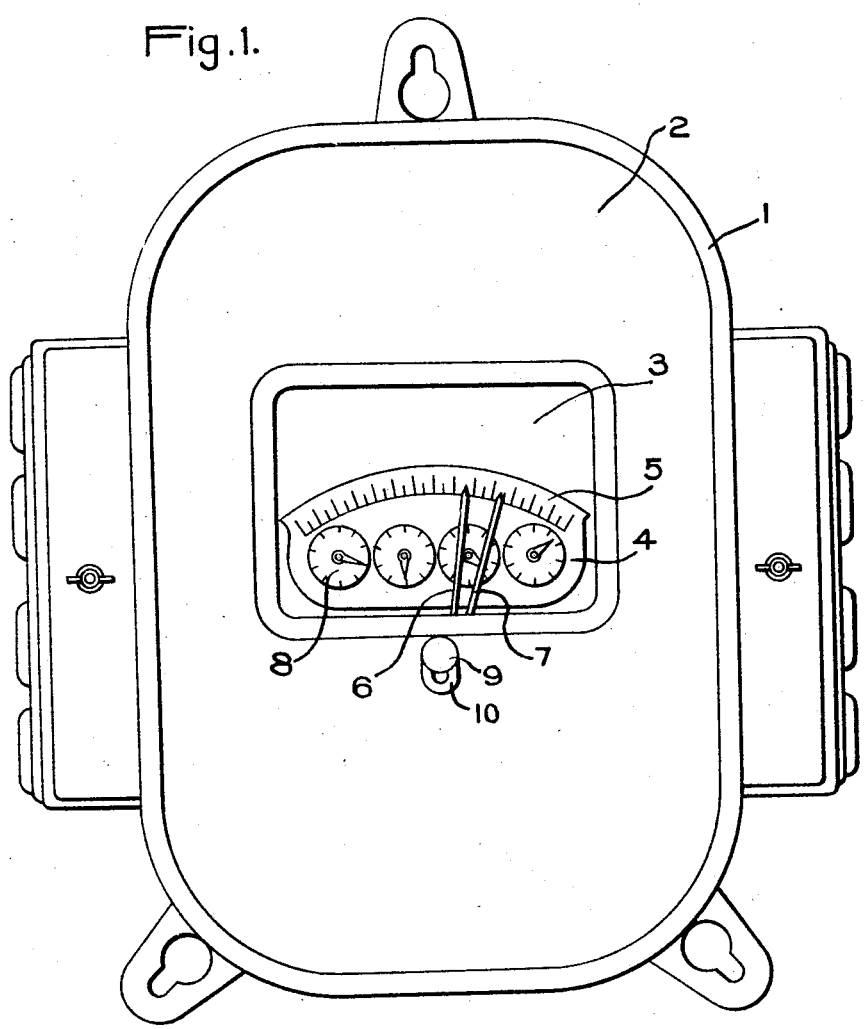
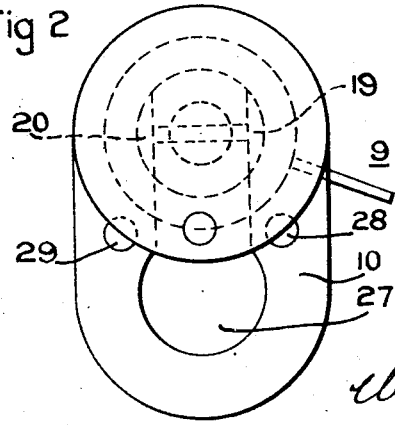
INVENTORS
Walter G. Mylius and
Bert G. La Bar
BY
ATTORNEY
WITNESSES:

Oct. 9, 1928.  
W. G. MYLIUS ET AL  
1,686,635  
ELECTRICAL MEASURING INSTRUMENT  
Filed March 31, 1927   2 Sheets-Sheet 2
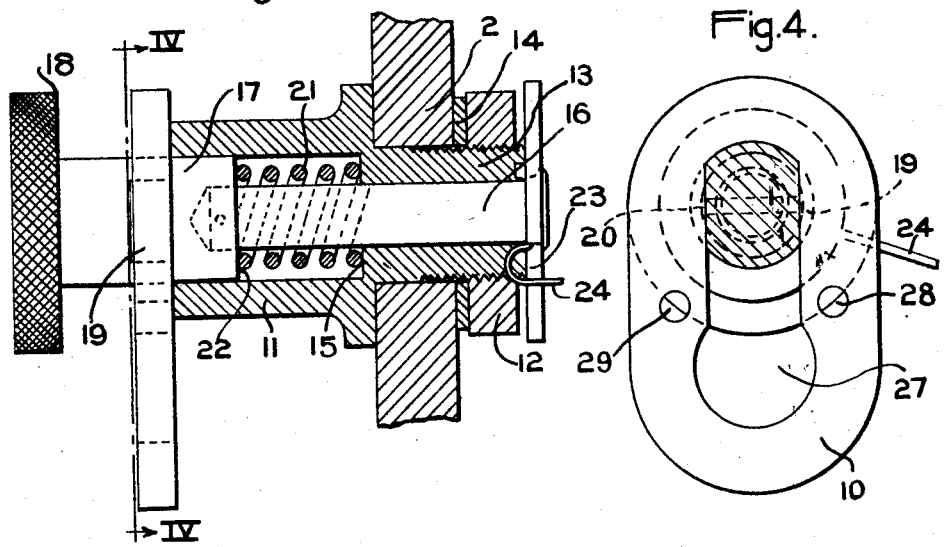
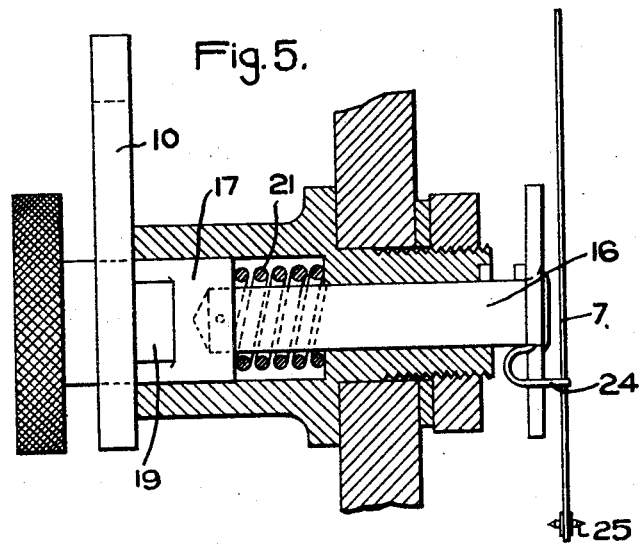
WITNESSES:
A. Schiefelbein.
B. R. King
INVENTORS
Walter G. Mylius and
Bert G. LaBar.
BY
ATTORNEY Patented Oct. 9, 1928.

1,686,635

UNITED STATES PATENT OFFICE.

WALTER G. MYLIUS, OF WILKINSBURG, AND BERT G. LA BAR, OF TURTLE CREEK, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

Application filed March 31, 1927. Serial No. 179,842.

Our invention relates to electrical measuring instruments and more particularly to pointer-reset locking devices therefor.

An object of our invention is to provide a pointer-reset device that is simple in construction, cheap in manufacture and effective in operation.

Another object of our invention is to provide a pointer-reset device that embodies a lock that is integral with a reset device.

In substantially all electrical demand measuring instruments, it is necessary to provide some means for resetting the pointers to zero. It is convenient to so mount such device on the cover of the instrument that the pointer may be reset at any time without removing the cover. In order that the device may not be operated by any unauthorized person, it is preferable to provide means for locking the pointer-reset device in such position that it is impossible to reset the pointer therewith.

Our invention comprises mounting a tubular member in the instrument cover in proximity to the axis of the pointer. A rotatable member is adapted to extend through the tubular member and is provided with means thereon for effecting engagement with the pointer. We provide resilient means for holding the rotatable member in an inoperative position and means for locking the member in that position.

A clear conception of our invention may be had by reference to the accompanying drawings, taken in connection with the following description. In the drawings, Fig. 1 is a front elevation view of a maximum demand watthour meter provided with a pointer-reset device constructed in accordance with our invention;

Fig. 2 is an enlarged detail plan view of the pointer-reset device shown in Fig. 1;

Fig. 3 is a side view of the device shown in Fig. 2, partially in section and partially in elevation;

Fig. 4 is a sectional view of Fig. 3, taken on the line IV—IV; and

Fig. 5 is a view, similar to Fig. 3, with the device in an operable position.

A meter 1 is provided with a cover 2 having a section 3 of transparent material. Behind the section 3 is mounted a demand attachment 4 comprising a demand scale 5, two pointers 6 and 7, and a watthour register 8. The pointer 6 is adapted to drive the pointer 7 for a fixed interval of time, whereby the position of the pointer 7, with regard to the scale 5, will indicate the maximum amount of energy passed through the meter. The pointer 7 is held in a position of maximum scale deflection by friction.

A pointer-reset device 9 is mounted on the cover 2 so that the pointer 7 may be reset to zero without removing the cover from the meter. The device 9 is provided with a locking member 10 whereby the pointer cannot be reset when the member is in the position shown but, for the operation of the device, must be moved to a new position with respect to the device, as will be more thoroughly explained hereinafter.

A tubular supporting member 11 is mounted on the cover 2 by means of a nut 12 on a threaded bushing portion 13. A washer 14 separates the nut 12 from the cover 2. The member 11 is provided with a shoulder 15 in its inner portion. A rotatable member 16 is secured to a shaft 17 and both are adapted to a slidable longitudinal motion within the member 11. The shaft 17 has an enlarged drum portion 18 provided with a knurled periphery. Two slots 19 and 20 are provided opposite each other in the shaft 17.

A spring 21 separates the shoulder 15 of the member 13 from a shoulder 22. The shoulder 22 is formed by the difference in diameter between the shaft 17 and the rotatable member 16.

The spring 21 is maintained in compression by a stop 23 suitably secured to an extremity of the member 16. An engaging member 24 is mounted on the inner extremity of the rotatable member 16 to effect engagement with the pointer 7 that is adapted to turn about a pivot 25.

The locking member 10 has a portion 20 adapted to slide in the slots 19 and 20 and an enlarged portion 27 of a slightly greater diameter than the diameter of the shaft 17 adapted to permit the inward longitudinal movement of the shaft 17.

The locking member is provided with holes 28 and 29 in which sealing wire may be placed to prevent tampering with the meter.

Fig. 3 shows the device in locked position. That is, the locking member 10 is shown cooperating with the supporting member 11 and the shaft 17 in the slots 19 and 20 to prevent a longitudinal movement of the member 16. The rotatable member 16 is free to rotate, however, but the member 24 is out of engagement with the pointer.

In order to reset the pointer 7, the locking member 10 must be moved to a position which is shown in Fig. 5. In this position of the locking member 10, the enlarged portion 27 permits the shaft 17 and the member 16 to be moved in a horizontal direction against the force of the spring 21. In this position, the engaging member 24 engages the pointer 7, whereby the latter may be pushed by turning the shaft 18 to any desired position. Upon resetting the pointer and releasing the shaft 17, the spring will force the rotatable member back into its normal position out of engagement with the pointer.

The opening 27 may be filled with a padlock to prevent the operation of the device by any unauthorized person.

Our invention is especially applicable to demand meters that embody glass covers, since only one hole is required to be drilled. A distinct advantage is therefore obtained since drilling glass is a costly and delicate mechanical operation. Another advantage of my invention, when used with glass covers, is that all stresses that may develop, in the locking action are limited to members of the resetting device, and are not impressed upon the glass cover. Heretofore, the cover was subjected to all stresses developed in the locking action.

We claim as our invention:

1. A pointer-reset device for an electrical measuring instrument having a pointer and a cover, comprising, a tubular supporting member having an inner portion thereof provided with a shoulder and an outer portion thereof provided with a shoulder and a threaded bushing adapted to fit an opening in the cover, a nut adapted to engage the threaded bushing and secure the supporting member to the cover, a member for separating the nut from the cover, a rotatable member adapted to be slidingly supported within the tubular member, the said rotatable member having a knurled end portion, slotted side portions and a shoulder, a spring adapted to resiliently separate the shoulder of the rotatable member from the shoulder in the inner portion of the tubular member, a member having an inner portion adapted to slidingly engage the slotted side portions of the rotatable member and an inner portion adapted to slidingly engage the periphery of the rotatable member, and a member secured to an end of the rotatable member whereby engagement with the pointer may be effected.

2. In combination, a deflection indicating pointer, a cover therefor, a reset device for said pointer comprising a tubular member, means for securing said tubular member to said cover, a member extending through the said tubular member for effecting engagement with said pointer, means for normally preventing engagement of the said member with the pointer, and means coacting only with said tubular member and said member for locking the said member in a position out of engagement with said pointer.

3. In combination, a deflection indicating pointer, a cover therefor, a reset device for said pointer comprising a tubular bushing, means for securing said bushing to said cover, a rotatable member slidingly supported within said bushing, means for resiliently permitting engagement of the said rotatable member with said pointer, and means coacting only with said bushing and said rotatable member for locking the rotatable member out of engagement with said pointer.

4. In an electrical measuring instrument comprising a maximum-demand pointer and a cover, a bushing secured thereto, a rotatable member slidably mounted within the bushing, whereby engagement between the rotatable member and the pointer may be effected to reset the pointer, and means mounted on the rotatable member whereby engagement of the rotatable member with the pointer may be prevented.

5. In an electrical measuring instrument comprising a maximum-demand pointer and a cover, a bushing secured thereto, a rotatable member having slotted side portions, the said rotatable member being adapted to extend through the bushing, means for mounting the rotatable member within the bushing, whereby engagement between the rotatable member and the pointer may be effected, a spring for biasing the rotatable member out of engagement with the pointer and means engaging the said slotted side portions of the rotatable member for preventing longitudinal movement of the rotatable member.

6. In a measuring instrument, the combination with a deflection-indicating pointer and a cover, of means for changing the position of said pointer from without said cover comprising a single opening in said cover, a bushing mounted in said opening, a rotatable longitudinally slidable member journalled to said bushing for engaging and turning said pointer, and a single member coacting only with said rotatable member and said bushing for preventing engagement of the rotatable member with the pointer.

7. In a measuring instrument, the combination with a deflection-indicating pointer and a cover, of means for changing the position of said pointer from without said cover comprising a single opening in said cover, a bushing mounted in said opening, a rotatable longitudinally slidable member journalled to said bushing for engaging and turning said pointer, and means for preventing longitudinal movement of said rotatable member to thereby keep the rotatable member out of engagement with the pointer.

In testimony whereof, we have hereunto subscribed our names this 28th day of March, 1927.

WALTER G. MYLIUS.
BERT G. LA BAR.